US011075806B1

(12) United States Patent
Srinivasan et al.

(10) Patent No.: US 11,075,806 B1
(45) Date of Patent: Jul. 27, 2021

(54) HIERARCHICAL NAMING SCHEME FOR STATE PROPAGATION WITHIN NETWORK DEVICES

(71) Applicant: Juniper Networks, Inc., Sunnyvale, CA (US)

(72) Inventors: Pramod Srinivasan, San Jose, CA (US); Dinesh Bakiaraj, Santa Clara, CA (US); David M. Katz, Santa Cruz, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 471 days.

(21) Appl. No.: 15/198,912

(22) Filed: Jun. 30, 2016

(51) Int. Cl.
*H04L 12/24* (2006.01)

(52) U.S. Cl.
CPC ...... *H04L 41/0823* (2013.01); *H04L 41/0846* (2013.01); *H04L 41/0856* (2013.01)

(58) Field of Classification Search
CPC ............. H04L 41/0823; H04L 41/0856; H04L 41/0846
See application file for complete search history.

(56) References Cited

U.S. PATENT DOCUMENTS

| | | | |
|---|---|---|---|
| 5,968,122 A * | 10/1999 | Schlosser | ................ H04L 41/12 709/220 |
| 6,721,880 B1 | 4/2004 | Pike | |
| 6,792,461 B1 | 9/2004 | Hericourt | |
| 6,876,625 B1 | 4/2005 | McAllister et al. | |
| 6,965,936 B1 | 11/2005 | Wipfel et al. | |
| 6,986,076 B1 | 1/2006 | Smith | |
| 7,275,081 B1 * | 9/2007 | Katz | ................ G06F 16/90344 709/203 |

(Continued)

FOREIGN PATENT DOCUMENTS

| | | |
|---|---|---|
| EP | 1117040 A2 | 7/2001 |
| EP | 1793542 A2 | 6/2007 |

(Continued)

OTHER PUBLICATIONS

"Junos XML Management Protocol Developer Guide" Junos OS, Juniper Networks, Inc., Feb. 14, 2019, 426 pp.

(Continued)

*Primary Examiner* — Nicholas R Taylor
*Assistant Examiner* — Tania M Pena-Santana
(74) *Attorney, Agent, or Firm* — Shumaker & Sieffert, P.A.

(57) ABSTRACT

In general, techniques are described for providing a hierarchical naming scheme used to propagate state information within network devices. A network device comprising a topic database and a processor may be configured to perform the techniques. The topic database may be configured to store a hierarchical naming scheme that associates objects representative of the state information to hierarchically arranged topics. The processor may be configured to associate consuming components within the network device to the hierarchically arranged topics, and operate as a producer component to publish an object to one of the hierarchically arranged topics. The processor may also be configured to propagate the published object to one of the consumer components associated with the one of the hierarchically arranged topics.

24 Claims, 5 Drawing Sheets

(56) References Cited

U.S. PATENT DOCUMENTS

| | | | |
|---|---|---|---|
| 7,518,986 B1* | 4/2009 | Chadalavada | H04L 45/00 370/218 |
| 7,702,640 B1 | 4/2010 | Vermeulen et al. | |
| 7,739,403 B1 | 6/2010 | Balakrishna et al. | |
| 7,917,578 B1* | 3/2011 | Katz | G06F 16/90344 709/203 |
| 8,798,055 B1* | 8/2014 | An | H04L 49/604 370/390 |
| 9,244,994 B1 | 1/2016 | Adoc et al. | |
| 9,424,140 B1 | 8/2016 | Madhavarapu et al. | |
| 10,104,039 B1 | 10/2018 | Knecht et al. | |
| 10,182,105 B2 | 1/2019 | Srinivasan et al. | |
| 2002/0083073 A1 | 6/2002 | Vaidya et al. | |
| 2002/0161889 A1 | 10/2002 | Gamache et al. | |
| 2004/0220979 A1 | 11/2004 | Young et al. | |
| 2005/0013310 A1 | 1/2005 | Banker et al. | |
| 2005/0240644 A1 | 10/2005 | Van Berkel et al. | |
| 2008/0288747 A1 | 11/2008 | Inglett et al. | |
| 2008/0294732 A1* | 11/2008 | Fletcher | H04L 67/16 709/206 |
| 2009/0138757 A1 | 5/2009 | Matsumoto et al. | |
| 2010/0128638 A1* | 5/2010 | Navas | G06F 16/2255 370/254 |
| 2010/0257149 A1 | 10/2010 | Cognigni et al. | |
| 2010/0309933 A1 | 12/2010 | Stark et al. | |
| 2011/0013508 A1* | 1/2011 | Tuplur | H04L 45/00 370/218 |
| 2011/0090787 A1 | 4/2011 | Smith et al. | |
| 2013/0232545 A1 | 9/2013 | Ma et al. | |
| 2013/0282920 A1 | 10/2013 | Zhang et al. | |
| 2014/0115137 A1 | 4/2014 | Keisam | |
| 2014/0165015 A1* | 6/2014 | Baumgartner | G06F 17/504 716/103 |
| 2014/0188794 A1 | 7/2014 | Dalton | |
| 2015/0248448 A1 | 9/2015 | Tsirkin | |
| 2016/0191611 A1 | 6/2016 | Srinivasan et al. | |
| 2016/0285678 A1 | 9/2016 | Rath et al. | |
| 2016/0328463 A1 | 11/2016 | Adoc et al. | |
| 2017/0302502 A1 | 10/2017 | Feng | |
| 2018/0176082 A1 | 6/2018 | Katz et al. | |
| 2018/0176093 A1 | 6/2018 | Katz et al. | |
| 2018/0176120 A1 | 6/2018 | Katz et al. | |

FOREIGN PATENT DOCUMENTS

| | | |
|---|---|---|
| EP | 2919130 A1 | 9/2015 |
| EP | 2930902 A3 | 10/2015 |
| EP | 3340055 A1 | 6/2018 |
| WO | 2001014948 A2 | 3/2001 |
| WO | 2015036791 A1 | 3/2015 |

OTHER PUBLICATIONS

"REST API Guide" Junos OS, Juniper Networks, Inc., Aug. 21, 2018, 50 pp.

U.S. Appl. No. 16/365,954, Juniper Networks, Inc., (inventors: Chandra et al.), filed Mar. 27, 2019 entitled Query Proxy for Delivery of Dynamic System State.

* cited by examiner

HIERARCHICAL NAMING SCHEME FOR STATE PROPAGATION WITHIN NETWORK DEVICES

TECHNICAL FIELD

The invention relates to network devices and, more particularly, to prorating state within network devices.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

Certain devices within the network, such as routers, maintain tables of information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table.

The physical connection between devices within the network is generally referred to as a link. A router uses interface cards (IFCs) for receiving and sending data packets via network links. These IFCs are installed in ports known as interfaces and are configured using interface configurations.

Generally, network devices such as routers maintains state information. For example, a router may maintain state information representing the current state of the interfaces between the router and the network. Such state information may include information representing the state of one or more IFCs, such as the current configuration of the IFCs. As additional examples, a router may maintain state information representing the state of one or more packet forwarding engines (PFEs), one or more routing engines, or other resources within the router.

In particular, a process, e.g., a control node known as a "routing engine," operating within a router may maintain the state information and communicate changes to the state information to various other processes or components within the router. These other processes or components are sometimes referred to as "consumers," because they receive and utilize (or, in other words, "consume") the state information maintained by the operating system. These consumers make use of the state information when performing their various functions.

As the complexity of conventional networks has increased in recent years, management of the state information within a router or other network device has likewise become a significant challenge. Some existing methods for managing state information involve caching the information within the operating system, and issuing state update notification messages to consumers executing within the router. In response, the consumers retrieve the state information from the operating system.

To increase reliability, some routers may include a primary routing engine and one or more standby routing engines. Both primary and standby routing engines may require state information. In the event that the primary routing engine fails, one of the standby routing engines assumes control of the routing resources to continue operation of the router. The process of switching control of routing functions between the primary and standby routing engines is often referred to as failover. In some instances, to assume proper control and ensure operation, the standby routing engine is forced to "relearn" the lost state information from each resource, e.g., by power cycling the router resources to a known state. This causes an interruption in packet forwarding while the router resources restart operations.

Routers have not only developed to be more reliable, but also to meet increasing bandwidth demands. One way to meet increasing bandwidth needs is to use multi-chassis routers, i.e., routers in which multiple routing devices are physically coupled and configured to operate as a single router. For example, a multi-chassis router may contain multiple line card chassis (LCCs), which include one or more IFCs, and a central switch card chassis (SCC), which forward packets between the LCCs and provides top-down management of the multi-chassis router. Because multi-chassis routers combine resources of multiple routing devices, multi-chassis routers typically have much higher bandwidth capabilities than standalone routers. The use of multi-chassis routers can simplify and improve routing on a service provider network by consolidating routing functions onto fewer routers. However, forwarding state information to each consumer in a multi-chassis router can be significantly more difficult than in a standalone router.

SUMMARY

Techniques are described for providing a hierarchical naming scheme for propagating state information from producers within a network device, such as a multi-chassis router, to consumers within the network device. Rather than push all state information produced by producers to every consumer, components within the multi-chassis router may utilize the hierarchical naming scheme so as to identify objects (which may refer to a discrete portion of the state information) with a scope of distribution to which consumers may subscribe. As such, the producers need only propagate (or, in others words, distribute) objects to those consumers that have requested the particular object. Using the hierarchical naming scheme, a consumer within the multi-chassis router may request any scope of state information up to and including all of the state information produced by any producer within the multi-chassis router down to an individual object.

The techniques may, in this way, allow for consumers to individually request state information of various scopes without having to process all of the state information and discard portions of the state information that are not relevant to the operation of the particular consumer. The hierarchical naming scheme may be extensible and, as such, may be adaptable to future developments in state information associated with new services or types of consumers.

In one aspect, a method of propagating state information within a network device comprises configuring, by the network device, a hierarchical naming scheme that associates objects representative of the state information to hierarchically arranged topics. The method also comprises associating, by the network device, consuming components within the network device to the hierarchically arranged topics. The method further comprises publishing, by a producer components of the network device, an object to one of the hierarchically arranged topics, and propagating, by the network device, the published object to one of the consumer components associated with the one of the hierarchically arranged topics.

In another aspect, a network device comprises a topic database configured to store a hierarchical naming scheme that associates objects representative of the state information to hierarchically arranged topics. The network device also comprises one or more processors configured to associate consuming components within the network device to the hierarchically arranged topics, operate as a producer component to publish an object to one of the hierarchically arranged topics, and propagate the published object to one of the consumer components associated with the one of the hierarchically arranged topics.

In another aspect, a non-transitory computer-readable storage medium has stored thereon instructions that, when executed, cause one or more processors of a network device to configure a hierarchical naming scheme that associates objects representative of the state information to hierarchically arranged topics, associate consuming components within the network device to the hierarchically arranged topics, publish an object to one of the hierarchically arranged topics, and propagate the published object to one of the consumer components associated with the one of the hierarchically arranged topics.

In another aspect, a multi-chassis router comprises a distributed topic database configured to store a hierarchical naming scheme that associates objects representative of the state information to hierarchically arranged topics. The multi-chassis router also comprises a first node that includes one or more processors configured to operate as consumer components. The multi-chassis router further comprises a second node that includes one or more processors configured to associate the consuming components within the network device to the hierarchically arranged topics, operate as a producer component to publish an object to one of the hierarchically arranged topics, and propagate the published object to one of the consumer components associated with the one of the hierarchically arranged topics.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
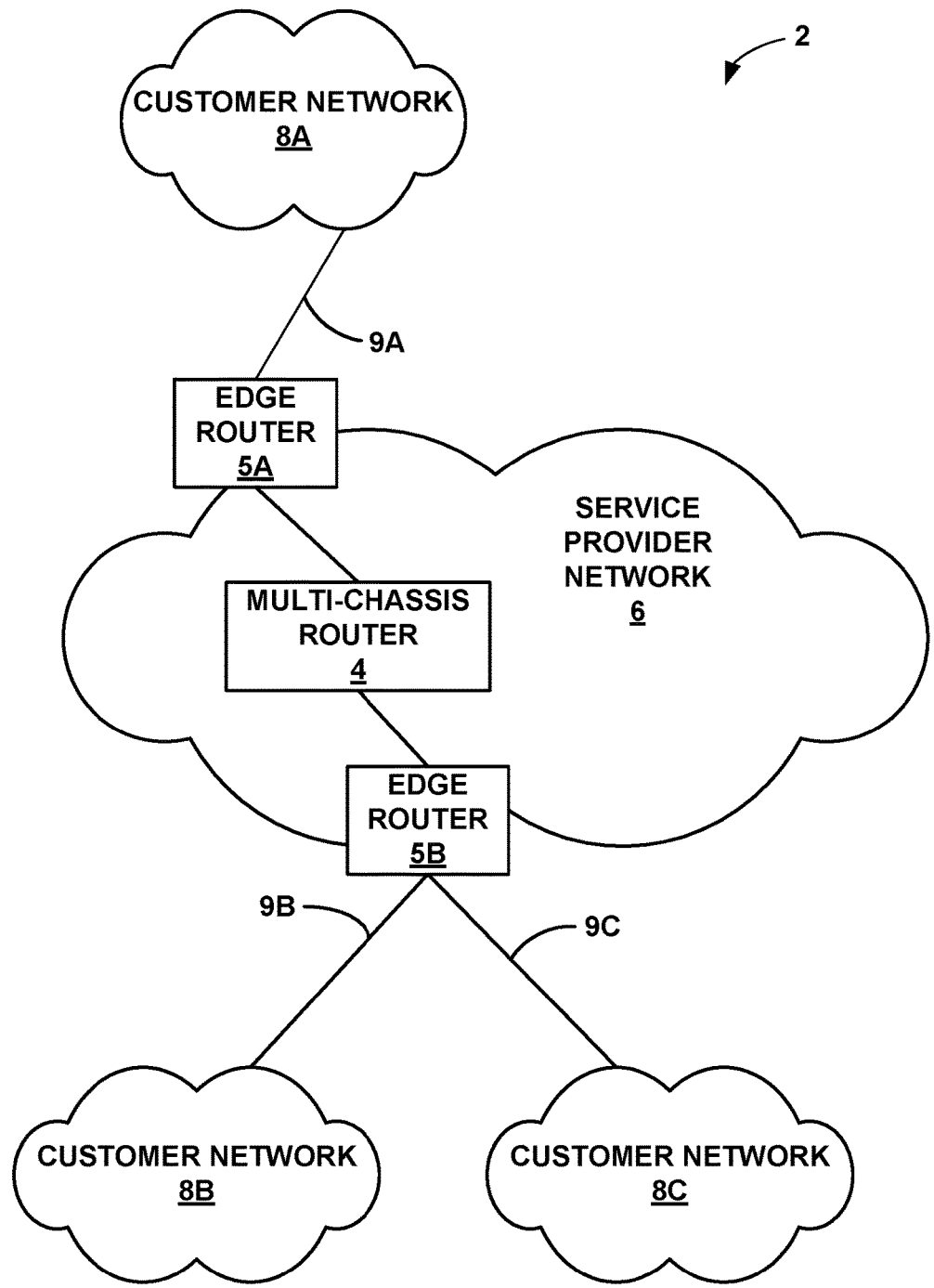
FIG. 1 is block diagram of an example network computing environment in which a service-provider network includes a multi-chassis router configured to operate in accordance with the state propagation techniques described in this disclosure.

FIG. 1 is a block diagram illustrating an example computing environment 2 in which service provider network 6 includes a multi-chassis router 4. In this example, multi-chassis router 4 communicates with edge routers 5A and 5B ("edge routers 5") to provide customer networks 8A-8C ("customer networks 8") with access to network 6. In one embodiment, multi-chassis router 4 includes a central switch card chassis (SCC) that operates as a control node and one or more line card chassis (LCCs) that operate as packet routing devices. The LCCs may contain all the physical interfaces for coupling to other devices within network 6, while the SCC controls and routes traffic between the LCCs.

Although not illustrated, service provider network 6 may be coupled to one or more networks administered by other providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within customer networks 8 to communicate with each other. Service provider network 6 may include a variety of network devices other than multi-chassis router 4 and edge routers 5, such as additional routers, switches, servers, or other devices.

In the illustrated embodiment, edge router 5A is coupled to customer network 8A via access link 9A and edge router 5B is coupled to customer networks 8B and 8C via access links 9B and 9C, respectively. Customer networks 8 may be networks for geographically separated sites of an enterprise. Customer networks 8 may include one or more computing devices (not shown), such as personal computers, laptop computers, handheld computers, cellular phones (including so-called "smart phones"), tablet computers, workstations, servers, switches, printers, or other devices. The configuration of network 2 illustrated in FIG. 1 is merely exemplary. For example, service provider network 6 may be coupled to any number of customer networks 8. Nonetheless, for ease of description, only customer networks 8A-8C are illustrated in FIG. 1.

Multi-chassis router 4 may provide for failover by including a primary routing engine as well as one or more standby routing engines. For example, an SCC may contain primary and standby master routing engines, and one or more LCCs may contain primary and standby local routing engines. Primary master routing engine may push state information to the standby master engine prior to forwarding the state information to the primary local routing engines in the LCCs. Similarly, the primary local routing engines forward the state information to one or more standby local routing engines prior to forwarding the state information to consumer components (which may be referred to as "consumers") within their chassis. In this manner, multi-chassis router 4 enforces a synchronization gradient when communicating state information throughout the multi-chassis environment.

In the event a primary routing engine fails, a standby routing engine in the same chassis assumes control over routing resources and routing functionality for that chassis. Moreover, because state information is delivered to a standby routing engine prior to forwarding the state information to a consumer, a standby routing engine can take up forwarding state information to consumers at the same place where the primary routing engine left off. U.S. Pat. No. 7,739,403 titled "Syncronizing State Information Between Control Units", filed Oct. 3, 2003, describes techniques for a synchronization gradient within a standalone router and is hereby incorporated by reference. U.S. Pat. No. 7,518,986 titled "Push-Based Heirarchical State Propagation within a Multi-Chassis Netowrk Device," filed Nov. 16, 2005, describes techniques for a push-based state synchronization within multi-chassis routers and is hereby incorporated by reference. In this manner, the primary and standby routing engines synchronize their respective state information to allow the standby routing engine to assume control of the router resources without having to relearn state information.

In instances where the primary master routing engine pushes state information to each consumer, each of the consumers receives any state information produced by the primary master routing engine. As networks become larger and more complex in terms of the number of services offered, the primary master routing engine may likewise produce more state information concerning the additional services, which has to be consumed by a potentially larger number of consumers (especially in the context of distributed systems, such as software defined networks having hundreds of nodes acting as consumers, or in large scale data centers having potentially hundreds of nodes acting as consumers). Producer components (which may also be referred to as "producers") may refer to any of the above noted components that produce state information, such as the primary master routing engine, primary local routing engines, and the like. Consumers may denote any of the above noted components that consume state information, such as primary local routing engines, interface cards, and the like.

In these circumstances, consumers may become inundated with state information that may or may not be relevant to the role of the consumers in multi-chassis router 4. Consumers may therefore receive a large amount of state information that must be processed to determine whether such state information is relevant, discarding any state information that the consumer does not require in order to perform the operations for which the consumers are configured to perform. Distribution of state information according to the push model where consumers passively receive all state information produced by producers (e.g., the primary master routing engine) may not adapt well as networks grow and become increasingly more complex (in terms of services offered, protocols executed, and the like).

In accordance with the techniques described in this disclosure, multi-chassis router 4 may be configured to utilize a hierarchical naming scheme for propagating state information from producers to consumers. Rather than push all state information produced by every producer to each and every consumer, multi-chassis router 4 may establish the hierarchical naming scheme so as to associate objects (which may refer to a discrete portion of state information) with a scope of distribution, which results in distribution of the objects only to those consumers that have requested the particular object. Using the hierarchical naming scheme, a consumer within multi-chassis router 4 may request any scope of state information up to and including all of the state information produced by any producer within multi-chassis router 4, and down to an individual object.

In operation, multi-chassis router 4 may execute a state distribution system by which to organize objects within the hierarchical naming scheme and assign scope identifiers ("scope IDs") to objects for purpose of distribution of objects to consumers. A producer may interface with the state distribution system to instantiate what may be referred to as a "topic." The topic may represent a name within the hierarchical naming scheme. A so-called "production topic" may refer to a topic for which objects are actually published. A so-called "topic prefix" may refer to a topic used as a prefix for another topic. Topic prefixes may be separate from production topics by a forward slash ("/"), resulting in strings resembling a file system path.

To illustrate, consider a topic "Int/Eth," having an "Int" topic prefix and an "Eth" production topic. A consumer, using the "Int/Eth" topic may request all state information associated with a particular type of interface (Int)—an Ethernet (Eth) interface of multi-chassis router 4, i.e., an Ethernet (Eth) interface in this example. A producer, such as the primary master routing engine of multi-chassis router 4, may first instantiate production topic "Int" followed by instantiating production topic "Eth" within the scope of topic prefix "Int."

Each topic prefix may have one or more production topics and/or one or more topic prefix below it in the hierarchy. For example, the "Int" topic prefix may have an "ATM" production topic as another child within the hierarchy in addition to the "Eth" production topic. The "ATM" production topic may represent a topic to which all state information for asynchronous transfer mode (ATM) interfaces is published. That is, the primary master routing engine of multi-chassis router 4 may publish all state information for ATM interfaces to the "Int/ATM" production topic.

In instantiating each production topic, the state distribution system of multi-chassis router 4 may associate each production topic with a scope ID. For example, the state distribution system may associate the "Int/ATM" production topic with a scope ID of 5, and the "Int/Eth" production topic with a scope ID of 6. Scope IDs may, in this respect, represent a way to tag an object. The state distribution system also associates a topic prefix with all of the scope IDs associated with production topics below the topic prefix in the hierarchy. In the above example, the state distribution system may associate the "Int" topic prefix with a scope ID of 5 and 6. In this way, the state distribution system may configure a hierarchical naming scheme that associates objects representative of state information to hierarchically arranged topics.

After instantiating the various topic prefixes and production topics within the state distribution system as new hierarchical topics, each consumer may receive an update to its locally maintained topic database that updates the topic database to include the new hierarchical topics. Consumers may then request either all state information associated with a topic prefix (such as "Int") or any of the state information associated with the particular production topic (such as "Eth"). In response to requests for a topic, the state distribution system may identify the scope IDs associated with the requested topic, and associate the consumer with the identified scope IDs. In this way, the state distribution system may associate consumer components (which may also be referred to as consumers) within the network device to the hierarchically arranged topics.

A producer may next publish an object to a production topic (which represents one of the hierarchically arranged topics), whereupon the state distribution system may identify which consumers are associated with the scope IDs of the production topic. The state distribution system may execute an object flooding protocol (OFP) that floods or, in other words, distributes the object to the corresponding consumers that either requested a topic prefix hierarchically arranged above the production topic, a production topic hierarchically arranged above the production topic to which the object is published or the production topic itself. In other words, the state distribution system may propagate the published object to one of the consumers associated with the hierarchically arranged topics. The consumers may then consume the objects to update a configuration of the consumers without having to perform extensive amounts of filtering.

In this way, rather than push all state information produced by producers to every consumer, multi-chassis router 4 may establish the foregoing hierarchical naming scheme so as to associate objects (which may refer to a discrete portion of state information) with a scope of distribution, which results in distribution of the objects only to those consumers that have requested the particular object. Using the hierarchical naming scheme, consumers within multi-chassis router 4 may request any scope of state information up to and including all of the state information produced by any producer within multi-chassis router 4 down to an individual object associated with a given production topic.

Although described below in reference to multi-chassis router 4, various aspects of the techniques may be applicable to any multi-chassis network device. For example, the techniques may be applied to edge routers 5, enterprise appliances, session border controllers, intelligent switches or hubs, firewalls or any other network device having a multi-chassis operating environment.

In the context of high availability routing, operating systems executing within the primary and standby routing engines of multi-chassis router 4 manage data structures and inform consumers of any change to the state information. Consumers may comprise software processes and the hardware executing the software processes within components of multi-chassis router 4, such as chassis management processes, configuration management processes, or other processes in multi-chassis router 4. Additionally, consumers of the state information may comprise hardware components, or combinations of software/firmware and hardware, such as one or more forwarding engines, IFCs or other hardware. It should be noted that, as to the master routing engine, the local routing engines are viewed as consumers with respect to state information. Similarly, as to local components within the LCCs, the local routing engines are providers of state information. Because of their dual role, the local routing engines may be viewed as intermediate consumers. Likewise, the standby routing engines in the SCC and the LCCs also operate as consumers as to the primary routing engines until taking over state information forwarding, e.g., in event of a failover.

Multi-chassis router 4 may manage state information within a hierarchically-ordered and temporally-linked data structures. One example of the use of hierarchically-ordered and temporally-linked data structures is described in U.S. Pat. No. 7,275,081 titled "Managing State Information in a Computing Environment," filed Jun. 9, 2003, hereby incorporated by reference in its entirety.

During normal operation, in the event state information changes, the primary master routing engine of a control node of multi-chassis router 4 (i.e., the SCC in this example) synchronizes state information with operating systems executing on the one or more standby master routing engines using various aspects of the above discussed hierarchical naming scheme. The primary master routing engine may replicate the state updates and transmits the state update in message form to the standby master routing engines, which have subscribed to all state information published by the primary master routing engine. The standby master routing engines receive the message and update their corresponding data structures to record the state updates.

Upon recording the state updates, the standby master routing engines may transmit an acknowledgement to the primary master routing engine to indicate successful state information synchronization. Once the primary master routing engine has received an acknowledgement from the standby master routing engines, it forwards the state information changes to the consumers of the SCC. For example, this includes any consumers located within the SCC. In addition, the primary master routing engine forwards the state information to the primary local routing engines on the LCCs, which are viewed as consumers to the primary master routing engine. The primary local routing engines then forward the state update information to one or more standby local routing engines on the LCCs. However, each LCC is not required to have a standby local routing engine, and some or all of the LCCs may only have a primary local routing engine. After receiving an acknowledgement from each standby local routing engine on that LCC, a primary local routing engine may then transmit the state update messages to consumers on the LCC that have subscribed to the state information using the hierarchically arranged naming scheme techniques of this disclosure.

In this manner, multi-chassis router 4 enforces the requirement that the standby master routing engines are updated with state information changes before consumers, and that the standby routing engines of the individual chassis are updated with the state information before any local consumers within the individual chassis. Therefore, if any of the primary routing engines fail, a corresponding standby routing engine can readily assume routing and state management functionality.

Once one of the standby routing engines assumes control that standby routing engine is no longer a standby routing engine, but becomes a primary routing engine; however, that routing engine will maintain its functional status as either a local or a master routing engine. In this regard, multi-chassis router 4 can be viewed as maintaining a "synchronization gradient" such that the primary master routing engine of the control node (i.e., the SCC) receives state updates first, followed by the standby master routing engines, and followed by consumers of the SCC including the primary local routing engines of the other chassis, followed by standby local routing engines, followed by the consumers within the other chassis. This synchronization gradient ensures that upon failover, a standby routing engine within any of the chassis contains enough state information to assume control of the router resources without having to relearn a substantial portion of the state information.

In some instances, the primary master and primary local routing engines may use commit markers and commit proposals within their data structures to track the state updates given to consumers. A commit marker may be inserted into the state update data structure after the most recent object within the temporally-ordered data structure which a consumer has acknowledged receiving. A commit proposal may be inserted into at a point in the state update date chain to indicate an acknowledgement request has been sent for all state update information up to that point in the chain. The primary master and primary local engines also replicate the position of commit markers and commit proposals within their data structure to the standby master and standby local routing engines. In this manner the standby routing engines also know which state updates have been received by which consumers.

Figure 2:
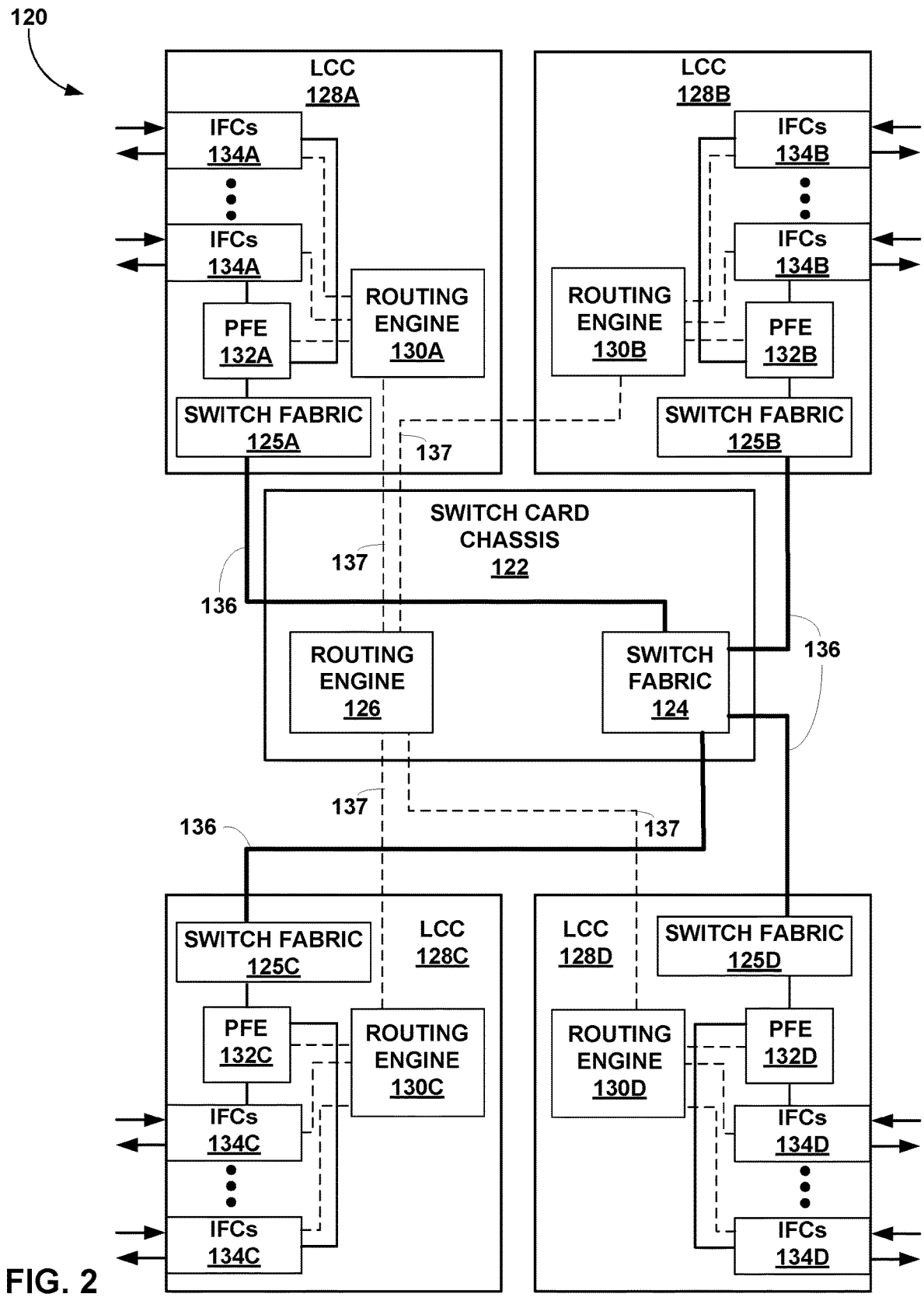
FIG. 2 is a block diagram illustrating an exemplary multi-chassis router configured to operate in accordance with the state propagation techniques described in this disclosure.

FIG. 2 is a block diagram illustrating an exemplary multi-chassis router 120 configured to operate in accordance with the techniques described in this disclosure. Multi-chassis router 120 routes data packets between network devices across a network. In this example, multi-chassis router 120 comprises four substantially identical LCCs 128A-128D ("LCCs 128") and SCC 122 that operates as a central control node. In other embodiments, a multi-chassis router may include more or less LCCs. SCC 122 provides centralized switching and control for multi-chassis router 120. LCCs 128 provide interfaces to a network using IFC sets 134A-134D ("IFCs 134").

SCC 122 includes switch fabric 124 and a master routing engine 126. Although not shown in the example of FIG. 2, SCC 122 may include a standby master routing engine when multi-chassis router 120 is configured as a high-availability router. Switch fabric 124 provides a back-side connection, i.e. a connection separate from the network, between switch fabric 125 of LCCs 128. Functions of master routing engine 126 include maintaining routing information to describe a topology of a network, and using that information to derive forwarding information bases (FIBs). Routing engine 126 controls packet forwarding throughout multi-chassis router 120 by installing the FIB in LCCs 128 via communication with local routing engines 130 over cables 137. A FIB for one of LCCs 128 may be the same or different than an FIB for other LCCs 128 and SCC 122. Because cables 137 provide a dedicated connection, i.e., separate from a data packet forwarding connection provided by cables 136, between SCC 122 and LCCs 128, FIBs in LCC routing engines 130 can be updated without interrupting packet forwarding performance of multi-chassis router 120.

LCCs 128 each contain one of local routing engines 130A-130D ("routing engines 130"), one of switch fabrics 125A-125D ("switch fabric 125"), at least one packet forwarding engine (PFE), shown as PFEs 132A-132D ("PFEs 132"), and one or more IFCs 134. In some examples when multi-chassis router 120 is configured to provide high-availability, LCCs 128 may also include one of standby local routing engines in addition to one of local routing engines 130, which may be referred to as primary local routing engines 130 in the high-availability configuration.

Multi-chassis router 120 performs routing functions in the following manner. An incoming data packet is first received from a network by one of IFCs 134, e.g., 134B, which directs it to one of PFEs 132, e.g., PFE 132B. The PFE then determines a proper route for the data packet using the FIB provided by the primary local routing engine, e.g., routing engine 130B. If the data packet is destined for an outbound link associated with the one of IFCs 134 that initially receive the packet, the PFE forwards the packet to the outbound link. In this manner, packets sent out by the same PFE on which they were received from the network bypass switch fabric 124 and switch fabric 125.

Otherwise, the PFE sends the data packet to switch fabric 125, where it is directed to switch fabric 124 and follows a route to one of the other PFEs 132, e.g., PFE 132D. This PFE, e.g., PFE 132D, sends the data packet across the network via one of IFCs 134, e.g., IFC 134D. Thus an incoming data packet received by one of LCCs 128 may be sent by another one of LCCs 128 to its destination. Other multi-chassis routers that operate in a manner consistent with the techniques described in this disclosure may use different switching and routing mechanisms.

Local routing engines 130 control and manage LCCs 128, but are subservient to master routing engine 126 of SCC 122. For example, after receiving state information updates from master routing engine 126, local routing engines 130 forward the state information update to consumers on LCCs 128 using the hierarchically-ordered and temporally-linked data structure. For example, consumers that receive state information updates from local routing engines 130 include PFEs 132 and IFCs 134. Local routing engines 130 also distribute the FIB derived by primary master routing engine 126 to PFEs 132.

Routing engines 126 and 130 may operate according to executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. The functions of multi-chassis router 120 may be implemented by executing the instructions of the computer-readable medium with one or more processors, discrete hardware circuitry, firmware, software executing on a programmable processor, or combinations thereof.

Initially, producer components (which may be referred to as "producers"), such as routing engines 126 and 130, may instantiate one or more topics arranged in a hierarchical manner. The hierarchically arranged topics may have various levels of scope with topics situated above another topic in the hierarchy being inclusive of any state published to the topics under a topic situated above the underlying topic.

As such, the hierarchically arranged topics may resemble a tree data structure in which nodes of the tree data structure represent topics. For example, topic/a is an aggregate of topics "/a," "/a/b," and "a/b/c." Topic "/a/b" is an aggregate, as another example, of topics "a/b," and "a/b/c." The topic string may represent a string representation of the topic, which in this case happens to be the topic hierarchy itself. In some examples, the hierarchically arranged topics will have only one root topic (which may be referred to as a "root topic node") with multiple hierarchies under the root topic node, similar to the tree data structure.

The consumers may, once these topics are instantiated, receive updates to a local topic database informing the consumer of the new topics. The consumers may then subscribe to the new topic such that the objects published to the topic are distributed only to the subscribing consumers. The consumers may then consume the objects to update local state information without having to filter or otherwise discard objects that are not relevant to the operation of the consumer.

The producers may instantiate a topic within the hierarchy through interactions with an application infrastructure. The application infrastructure may tag each topic with one or more 32-bit scope IDs (which are collectively referred to as a scope vector) identifying the scope to which the corresponding tagged object is to be delivered. Each consumer subscribes to one or more scope IDs (via requests for the corresponding topic), and the application infrastructure automatically delivers the objects having the corresponding scope IDs to the consumers that requested such topics. The various units responsible for mapping scope IDs to objects and distribution of the objects is described in more detail with respect to a single node of multi-chassis router 120 shown in FIG. 3.

Figure 3:
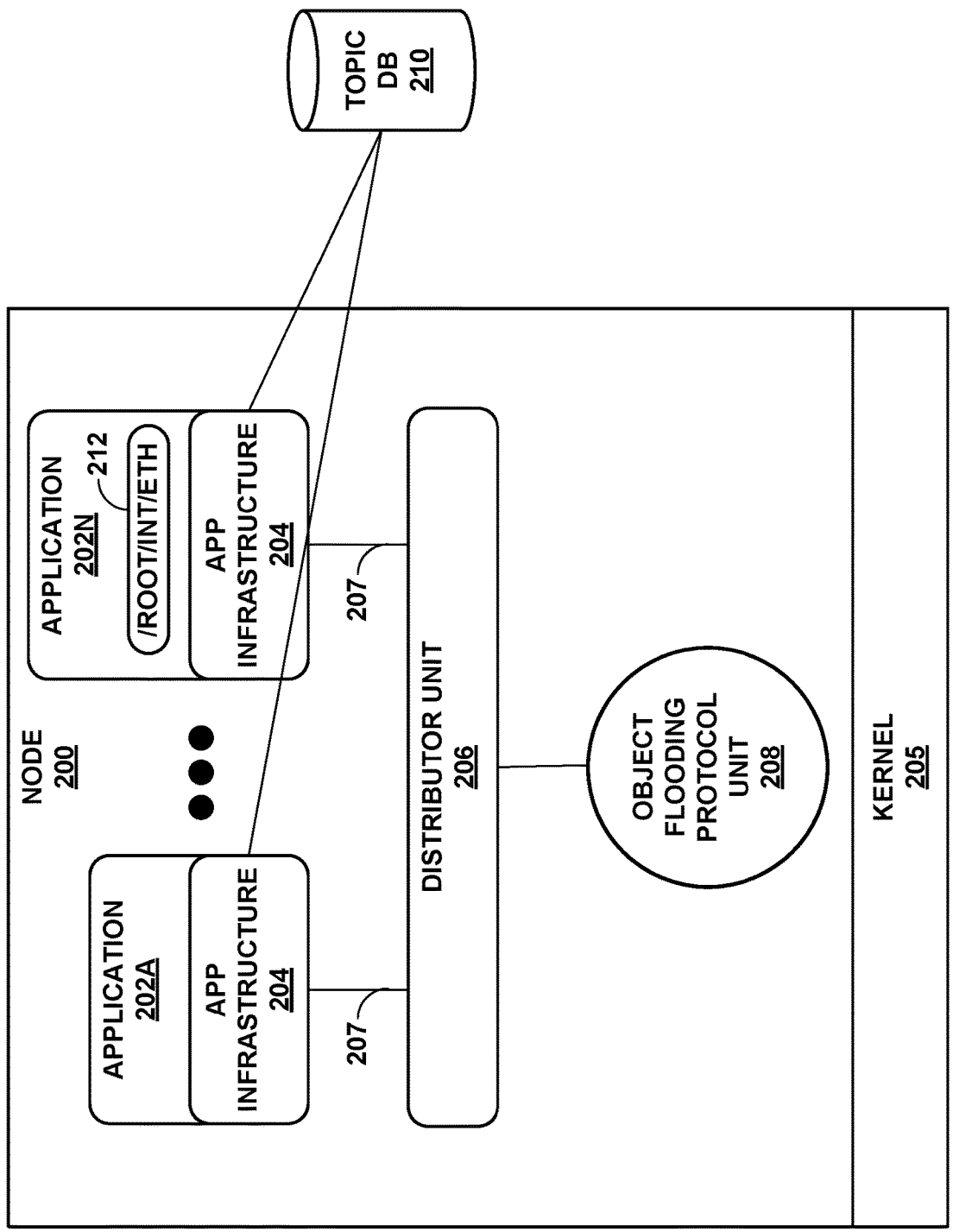
FIG. 3 is a block diagram illustrating an example node of multi-chassis router shown in FIG. 2 configured to operate in accordance with various aspects of the state propagation techniques described in this disclosure.

FIG. 3 is a block diagram illustrating an example node 200 of multi-chassis router 120 configured to operate in accordance with various aspects of the techniques described in this disclosure. As examples, node 200 may represent either switch card chassis 122 or one of line card chassis 128.

As shown in FIG. 3, node 200 executes applications 202A-202N ("applications 202"). Each of applications 202 include application infrastructure 204 ("app infrastructure 204"), which may represent a library or driver incorporated by applications 202. Application infrastructure 204 may represent an interface (e.g., an application programming interface or API) by which applications 202 interface with distributer unit 206 executing on top of kernel 205. Application infrastructure 204 may establish a socket 207A-207N ("socket 207") with kernel 205 to interface with distributer unit 206. In this way, application interface 204 may provide a set of services from within the application context.

Distributor unit 206 may represent a unit configured to pass objects between object flooding protocol (OFP) unit 208 ("OFP unit 208") and applications 202. In particular, distributor unit 206 may efficiently distribute objects to multiple applications on the same node 200. OFP unit 208 may represent a unit configured to execute OFP to distribute objects between nodes.

Each node, such as node 200, may also interface with a topic database 210 ("topic DB 210"). In particular, applications 202 may interface with topic database 210 via application infrastructure 204. Topic database 210 may execute Apache Zookeeper, which may store data according to a hierarchical name space, much like a file system or a tree data structure. Topic database 210 may store the hierarchically arranged topics. Topic database 210 may provide synchronization services between a number of local databases. In this example, topic database 210 may represent a distributed database with local copies on each node that is synchronized via Zookeeper or other database synchronization protocols.

Generally, objects are only visible to applications 202. Distributor unit 206 and OFP unit 208 may only receive serialized versions of objects, where the serialized versions of the objects may comprise strings of bytes that, from the perspective of distributer unit 206 and OFP unit 208, have no meaning. The serialized versions of the objects may also include metadata, such as the objected globally unique identifier (GUID), object logical clock, and the object scope ID (or a pointer into the scope vector identifying the scope ID). Application infrastructure 204 may perform the serialization and deserialization of objects. However, application infrastructure 204 may not be aware of the contents of the objects. As such, only applications 202 are "object-aware." Given that only applications 202 are object-aware, distributor unit 206 and OFP unit 208 may only distribute objects based on scope (i.e., scope IDs in this example).

Applications 202 may instantiate a new production topic by publishing an object to the new production topic. Applications 202N may, for example, invoke application infrastructure 204 to publish an object to the new production topic. Application infrastructure 204 may map the new production topic to a scope ID within the scope vector. Application infrastructure 204 may perform this mapping by performing an atomic write to topic database 210 using a production topic name (with some topic prefix) as the path in topic database 210 and the selected scope ID as the data written to the path. Topic database 210 may persistently maintain topics once mapped.

In the example of FIG. 3, application 202N may create an object 212 assigned to new production topic/root/int/eth, passing object 212 to application infrastructure 204. Application infrastructure 204 may interface with topic database 210 to map the topic to which object 212 is published to a scope ID. After mapping the topic to the scope ID, topic database 210 may synchronize thereby allowing any consumer within node 200 or any other node to subscribe to the new production topic.

Consumers of objects may then subscribe to the new production topic/root/int/eth. For example, application 202A may act as a consumer and interface with topic database 210 via application infrastructure 204 to subscribe to the/root/int/eth production topic. Application infrastructure 204 may configure, as one example, a Zookeeper "watch" on the prefix/root/int/eth (and all children of that prefix of which there are none in this example). When any production topic appears that is covered by the topic prefix, application 202A subscribes to the corresponding scope, which may result in automatically updating the set of scope subscriptions as the set of topics changes.

In some examples, the techniques may allow subscribers (or, in other words, consumers) to arrive before publishers. A topic prefix may not have any child production topic, in which case subscribers to the topic prefix may not receive any objects until a production topic is created below the topic prefix in the hierarchy. When one of applications 202 publishes an object to a production topic arranged hierarchically below the topic prefix, application infrastructure 204 automatically updates the production topic to scope ID mapping in topic database 210 and consuming ones of applications 202 subscribed to the topic prefix automatically subscribe to the production topic organized below the topic prefix in the hierarchy.

Figure 4:
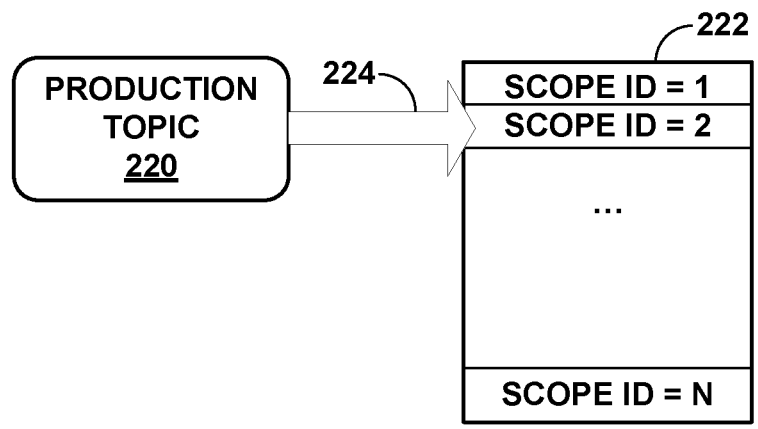
FIG. 4 is a diagram illustrating mapping of a production topic to a scope ID within a scope vector in accordance with various aspects of the state propagation techniques described in this disclosure.

In this manner, applications 202 may establish a hierarchy of production topics, which may include topic prefixes. Application infrastructure 204 may map the production topics to scope IDs. FIG. 4 is a diagram illustrating mapping of a production topic 220 to a scope ID within scope vector 222 in accordance with various aspects of the techniques described in this disclosure. As shown in FIG. 4, application infrastructure 204 may specify production topic 220 (e.g., /root/int/eth) in topic database 210 with a pointer 224 pointing to the second entry of scope vector 222, mapping production topic 220 to a scope ID of two.

Figure 5:
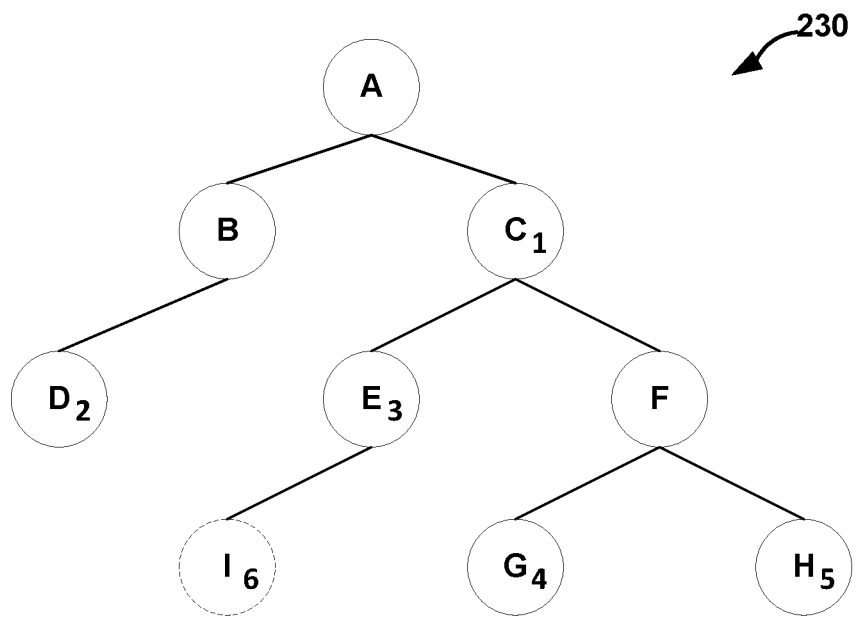
FIG. 5 is a diagram illustrating an example topic hierarchy stored to a topic database in accordance with the state propagation techniques described in this disclosure.

FIG. 5 is a diagram illustrating an example topic hierarchy 230 stored to a topic database in accordance with the techniques described in this disclosure. In the example of FIG. 5, topic hierarchy 230 includes topics A-H. Topic A is a root topic within topic hierarchy 230, having child topics B and C. Topic B is a child topic to root topic A, and a parent topic to topic D. Topic C is a child topic to root topic A, and a parent topic to topics E and F. Topic D is a child topic to topic B. Topic E is a child topic to topic C. Topic F is a child topic to topic C, and a parent topic to topics G and H. Topics G and H are each child topics to topic F.

In the example of FIG. 5, topics C, D, E, and H each have a number next to its corresponding letter. The number indicates the scope ID to which each of topics C, D, E, and H are associated (or, in other words, mapped). As such, topic C is mapped to scope ID 1 within the scope vector (such as scope vector 222 shown in FIG. 4). Topic D is mapped to scope ID 2 within scope vector 222. Topic E is mapped to scope ID 3 within scope vector 222. Topic G is mapped to scope ID 4 within scope vector 222. Topic H is mapped to scope ID 5 within scope vector 222. Given that only production topics may be mapped to scope IDs, each of topics C, D, E, and H may represent a production topic. Topics A, B, and F each represent topic prefixes.

Topic hierarchy 230 may thereby allow for distribution of objects according to various scopes, allowing consumers to subscribe to any one of topics A-H. For example, application 202A may invoke application infrastructure 204 to subscribe to topic A (requesting "/A"). Application infrastructure 204 may establish the subscription by setting Zookeeper watches for scope IDs corresponding to any production topic below topic A in topic hierarchy 230 (i.e., scope IDs 1-5 corresponding to Topics C, D, E, and H in this example). As another example, application 202A may invoke application infrastructure 204 to subscribe to topic C (requesting topic "/A/C"), which may establish the subscription by setting Zookeeper watches for scope IDs corresponding to topic C (i.e., 1 in this example), and any production topics below topic C (i.e., scope IDs 3, 4, and 5 corresponding to topics E, G and H in this example). In this way, a consumer may be associated with one or more of the hierarchically arranged topics A-H by associating the consumer with the scope identifier associated with a production topic.

In other words, topic hierarchy 230 may represent a hierarchical naming scheme that includes various combinations of topic prefixes and production topics. The combinations may include a topic prefix arranged hierarchically above a production topic, which occurs in the example of FIG. 5 with topic prefix A being hierarchically arranged above production topics C, D, E, and H or with topic prefix B being hierarchically arranged above production topic D, or with topic prefix F being hierarchically arranged above production topics G and H. The combinations also include a production topic arranged hierarchically above another production topic, which occurs in the example of FIG. 5 with production topic C being hierarchically arranged over production topics E, and H. The combinations further include a production topic hierarchically arranged above a topic prefix, which occurs in the example of FIG. 5 with production topic C being hierarchically arranged above topic prefix F.

As noted above, a producer may update topic hierarchy 230 to include a new production topic I after objects have been published to existing production topics C, D, E, and H, which may result in dynamically associating consumer to the new production topic I. That is, the consumer subscribed to topic prefix A may receive any objects published to production topics C, D, E, and H prior to the new production topic I being configured within topic hierarchy 230. The consumer subscribed to topic prefix A is automatically subscribed (by virtue of the hierarchy) to production topic I upon updating topic hierarchy 230 stored to topic database 210 to include production topic I. Restated, node 200 may automatically associate, in addition to the association of the consumer to scope IDs 1-5, the consumer to scope ID 6 assigned to production topic I hierarchically arranged under the subscribed topic prefix A.

In some example, applications 202 may formulate more complicated subscriptions using topic expressions. A topic expression may represent a logical expression comprised of topic prefixes and other information (such as object content) that can be used to further refine selection of objects. An example topic expression may include "topic/root/int && mtu>1500," which may select objects corresponding to topic "/root/int" having a maximum transmission unit (mtu) greater than 1500 bytes. A topic prefix is, in some ways, a degenerate form of a topic expression. That is, a topic prefix is a simple form of a topic expression.

In this way, producers may establish topic hierarchy 230 within topic database 210 in a manner that allows consumers to only subscribe to certain portions of state information relevant to the operation of the consumer. The consumers (such as applications 202) may interface with the state distribution system (represented by distributor unit 206, OFP unit 208 and topic database 210) via application infrastructure 204 to issue requests that objects published to production topics hierarchically arranged under a topic prefix be propagated to the requested consumer. Such requests may, as described above, be established as Zookeeper watches configured within topic database 210. Establishment of the Zookeeper watch effectively associates the requesting consumer to the scope identifiers associated with production topics hierarchically arranged under the requested topic prefix (or production topic).

Once topic hierarchy 230 has been established, producers may begin to publish objects, such as object 212, to various production topics. Publication of objects by the producers results in distributor unit 206 in propagating object 212 to those consumers associated with the scope ID assigned to object 212. By propagating object 212 only to those consumers associated with the scope ID assigned to object 212, the techniques may avoid propagating state information (in the form of objects) to consumers for which such state information is not relevant to the operation of the consumer. Avoiding needless communication of irrelevant state information may promote more efficient operation of multi-chassis router 120 given that consumers need not filter objects to select only those objects having state information relevant to the operation of that particular consumer.

Although described above as being published to a single topic, an object may be mapped to two or more production topics. As such, application infrastructure 204 may assign two or more scope IDs to an object, which may result in distribution to two or more different sets of consumers considering that each consumer is mapped to one or more different scope IDs. The techniques of this disclosure should therefore not be limited in this respect.

In high availability instances where a primary producer works together with a standby producer, the techniques may allow for state information synchronization using a production identifier (ID). That is, producers of objects may manage all objects in a production set (which may refer to all objects carrying a unique production ID). The production ID may allow for failover, providing an ID used by a backup or standby producer to identify and process all objects produced by the primary producer. Whenever a producer publishes an object, application infrastructure 204 may tag the object with a production ID, which may be defined as "/ProductionID/<prodID>," where <prodID> denotes the actual production ID value assigned to the producer. A backup or standby producer may subscribe to the productionID of the primary producer and thereby receive all object published by the primary producer.

Furthermore, in the context of logical systems in which a single node implements two or more virtual routing functions, topic hierarchy 230 may be further partitioned using topic namespaces. That is, node 200 may execute two virtual routing functions (VRFs) that each appear as a separate router. In these systems running multiple logical systems (e.g., VRFs), there are three types of components. A global component may oversee all of the VRFs. A local component may oversee only one of the VRFs. A straddling component may oversee two or more but not all of the VRFs.

With consideration given to these different types of components, topic infrastructure 204 may partition topic hierarchy 230 using topic namespaces. Producers producing into topics internal to a logical system may establish a "/root/lsys1/<n>," where "lsys" refers to a logical system and "<n>" denotes a number assigned to the logical system. Producers producing into global topics would remove the "/lsys/<n>" from the foregoing topic prefix resulting in publication of objects to "/root."

Application infrastructure 204 may automatically extend topic names for local components to include the "/lsys/<n>" topic prefix. A routing protocol daemon (RPD) may represent one type of application 202 that is a local component. RPD may produce objects for publication to a topic "/type/route." Application infrastructure 204 may automatically extend "/type/route" to be "/root/lsys/<n>/type/route." Application infrastructure 204 may automatically extend subscriptions for consumers that operate entirely within the logical system in a similar manner.

Figure 6:
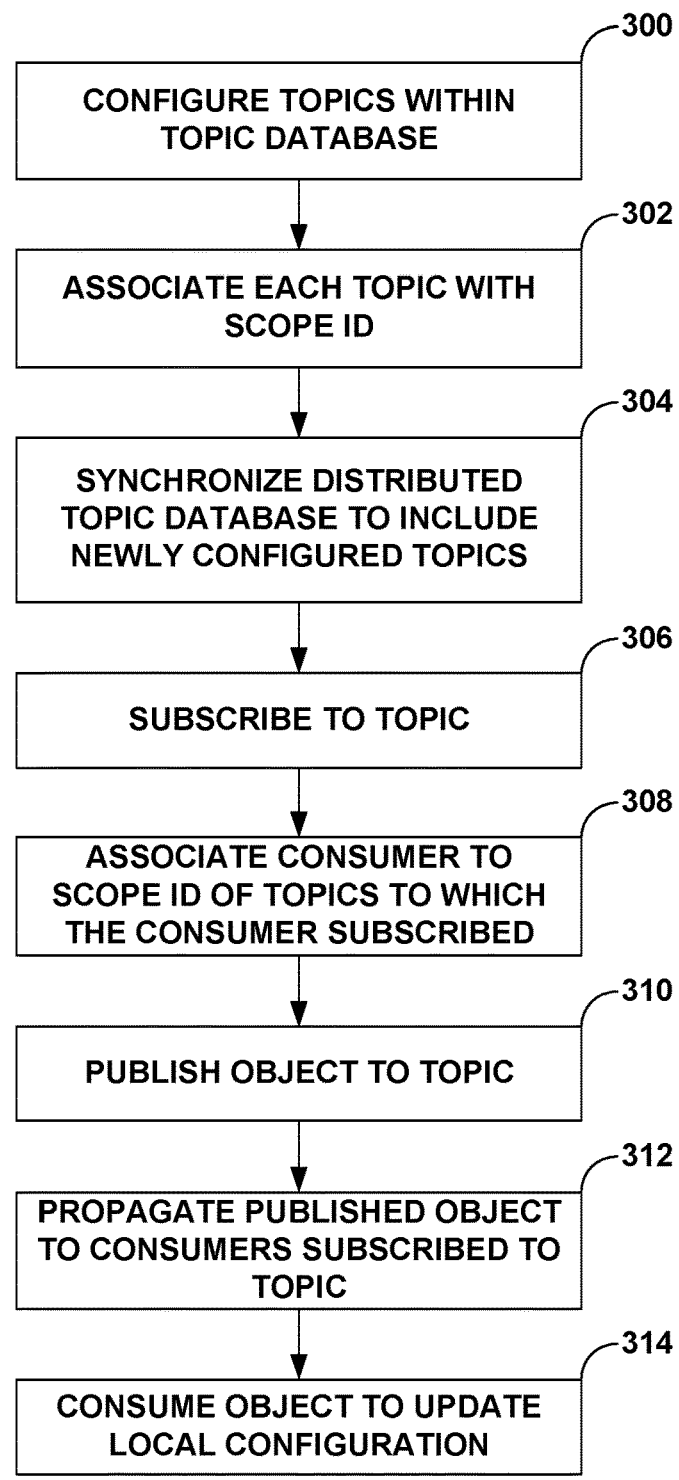
FIG. 6 is a flowchart illustrating example operation of a node of a multi-chassis router in performing various aspects of the state propagation techniques described in this disclosure.

FIG. 6 is a flowchart illustrating example operation of a node of a multi-chassis router in performing various aspects of the state propagation techniques described in this disclosure. For example, multi-chassis router 4 may execute a state distribution system by which to organize objects within the hierarchical naming scheme and assign scope identifiers ("scope IDs") to objects for purpose of distribution of objects to consumers. A producer, such as one of applications 202 shown as executed by node 200 in the example of FIG. 3, may interface with the state distribution system to instantiate, or in other words, configure one or more topics within topic database 210 (300). In instantiating each production topic, application infrastructure 204 of the state distribution system (which may be comprised of application infrastructure 204, distributor unit 206 and OFP unit 208) may associate each production topic with a scope ID (302).

After instantiating the various topic prefixes and production topics within the state distribution system as new hierarchical topics, each consumer may receive an update to its locally maintained topic database that updates the topic database to include the new hierarchical topics. As noted above, topic database 210 may represent a distributed database that is synchronized across various local databases. As such, topic database 210 may synchronize in order to update the local databases with the newly configured topics (304).

Consumers may then subscribe to all state information associated with a topic, and any topics below the topic to which the consumers subscribed (306). In response to consumers establishing subscriptions to a topic, the state distribution system may identify the scope IDs associated with the topics to which the consumer has subscribed, and associate the consumer with the identified scope IDs of topics to which the consumer subscribed (308).

A producer may next publish an object to a production topic (310). Distributor unit 206 of the state distribution system may identify which consumers are associated with the scope IDs of the production topic to which the object is published. If the consumer is local to node 200, distributor unit 206 may distribute the object directly to the consumer. If the consumer is remote (or, in other words, not executed by) node 200, distributor unit 206 may provide the object to OFP unit 208. OFP unit 208 may flood or, in other words, distribute or propagate the object to the remote consumers. In this way, the state distribution system may propagate the published object to one of the consumers associated with the hierarchically arranged topics (312). The consumers may then consume the objects to update a local configuration of the consumers without having to perform extensive amounts of filtering (314).

One or more of the techniques described herein may be partially or wholly executed in software. For example, a computer-readable medium may store or otherwise comprise computer-readable instruction, i.e., program code that can be executed by a processor to carry out one or more of the techniques described above. For example, the computer-readable medium may comprise random access memory (RAM), read-only memory (ROM), non-volatile random access memory (NVRAM), electrically erasable programmable read-only memory (EEPROM), flash memory, magnetic or optical media, or the like.

Various embodiments of the invention have been described. Although described in reference to a multi-chassis router, which each chassis including a plurality of routing engines, the techniques may be applied to any multi-chassis device having a plurality of control nodes in at least one chassis. Examples of other devices include switches, gateways, intelligent hubs, firewalls, workstations, file servers, database servers, and computing devices generally. Furthermore, the described embodiments refer to hierarchically-ordered and temporally-linked data structures, but other embodiments may use different data structures. These and other embodiments are within the scope of the following claims.

The invention claimed is:

1. A method of propagating state information within a single network device, the method comprising:
    configuring, by the single network device, a hierarchical naming scheme for distributing the state information locally within the network device, the hierarchical naming scheme associating objects representative of the state information to hierarchically arranged topics, and the state information representing a current state of resources within the single network device;
    associating, by the single network device, consumer components executing within the single network device to the hierarchically arranged topics;
    publishing, by a producer component executing within the single network device, an object to one of the hierarchically arranged topics;
    propagating, by the single network device, the published object to one of the consumer components associated with the one of the hierarchically arranged topics; and
    consuming, by the one of the consumer components, the propagated object to update a configuration of the one of the consumer components.

2. The method of 1, wherein configuring the hierarchical naming scheme comprises:
    configuring a propagation topic to which the objects are capable of being published; and
    configuring a topic prefix to be hierarchically arranged above the propagation topic.

3. The method of claim 2, wherein configuring the hierarchical naming scheme further comprises associating the propagation topic with a scope identifier.

4. The method of claim 3, wherein associating the propagation topic with the scope identifier comprises:
    identifying the scope identifier in a scope vector, the scope vector including a plurality of scope vectors; and
    associating the propagation topic to the identified scope identifier in the scope vector.

5. The method of claim 4, further comprising subscribing, by the one of the consumer components, to the topic prefix hierarchically arranged above the production topic,
    wherein associating the consumer components to the hierarchically arranged topics comprises associating the one of the consumer components to the scope identifier associated with the production topic hierarchically arranged under the topic prefix.

6. The method of claim 5,
    wherein the propagation topic comprises a first propagation topic and the scope identifier comprises a first scope identifier, and wherein configuring the hierarchical naming scheme further comprises:
after configuring the first propagation topic, configuring a second propagation topic to which the objects are capable of being published to be hierarchically arranged under the topic prefix; and
associating the second propagation topic with a second scope identifier, and
wherein associating the consumer components to the hierarchically arranged topics comprises associating, in addition to the association of the one of the consumer components to the first scope identifier, the one of the consumer components to the second scope identifier associated with the second production topic hierarchically arranged under the topic prefix.

7. The method of claim 4, further comprising subscribing, by the one of the consumer components, to the topic prefix hierarchically arranged above the production topic using a topic expression that identifies the topic prefix and includes an expression that requests only a subset of the objects published to the propagation topic.

8. The method of claim 1, further comprising executing multiple logical systems,
wherein the producer component operates entirely within a single one of the multiple logical systems,
wherein the method further comprises, in response to determining that the producer component operates entirely within the one of the multiple logical systems, automatically extending the one of the hierarchically arranged topics to include a topic prefix identifying the single one of the multiple logical systems.

9. The method of claim 8, further comprising:
subscribing, by the one of the consumer components, to the one of the hierarchically arranged topics; and
in response to determining that the one of the consumer components operates entirely within the single one of the multiple logical systems, automatically extending the one of the hierarchically arranged topics to include the include a topic prefix identifying the single one of the multiple logical systems.

10. The method of claim 1, wherein configuring the hierarchical naming scheme comprises:
configuring a first propagation topic to which the objects are capable of being published; and
configuring a second propagation topic to which the objects are capable of being published to be hierarchically arranged above the first propagation topic.

11. The method of claim 1,
wherein the producer components comprise one or more of a master routing engine and a local routing engine, and
wherein the consumer components comprise one or more of the local routing engine, an interface card, and a packet forwarding engine.

12. A network device comprising:
a topic database configured to store a hierarchical naming scheme for distributing state information locally within the network device, the hierarchical naming scheme associating objects representative of the state information to hierarchically arranged topics, the state information representing a current state of resources within the single network device, and the network device is a single network device; and
one or more processors configured to:
associate consumer components executing within the single network device to the hierarchically arranged topics;

operate as a producer component executing within the single network device to publish an object to one of the hierarchically arranged topics; and
propagate the published object to one of the consumer components associated with the one of the hierarchically arranged topics, wherein the one of the consumer components is configured to consume the propagated object to update a configuration of the one of the consumer components.

13. The network device of 12, wherein the one or more processors are configured to:
configure a propagation topic to which the objects are capable of being published; and
configure a topic prefix to be hierarchically arranged above the propagation topic.

14. The network device of claim 13, wherein the one or more processors are configured to associate the propagation topic with a scope identifier.

15. The network device of claim 14, wherein the one or more processors are configured to identify the scope identifier in a scope vector, the scope vector including a plurality of scope identifiers, and associating the propagation topic to the identified scope identifier in the scope vector.

16. The network device of claim 15, wherein the one of the consumer components is configured to subscribe to the topic prefix hierarchically arranged above the production topic,
wherein the one or more processors are configured to associate the one of the consumer components to the scope identifier associated with the production topic hierarchically arranged under the topic prefix.

17. The network device of claim 16,
wherein the propagation topic comprises a first propagation topic and the scope identifier comprises a first scope identifier, and
wherein the one or more processors are configured to:
after configuring the first propagation topic, configure a second propagation topic to which the objects are capable of being published to be hierarchically arranged under the topic prefix; and
associate the second propagation topic with a second scope identifier, and
associate, in addition to the association of the one of the consumer components to the first scope identifier, the one of the consumer components to the second scope identifier associated with the second production topic hierarchically arranged under the topic prefix.

18. The network device of claim 15, wherein the one of the consumer components is configured to subscribe to the topic prefix hierarchically arranged above the production topic using a topic expression that identifies the topic prefix and includes an expression that requests only a subset of the objects published to the propagation topic.

19. The network device of claim 12,
wherein the one or more processors are further configured to execute multiple logical systems,
wherein the producer component operates entirely within a single one of the multiple logical systems,
wherein the one or more processors are further configured to, in response to determining that the producer component operates entirely within the one of the multiple logical systems, automatically extend the one of the hierarchically arranged topics to include a topic prefix identifying the single one of the multiple logical systems.

20. The network device of claim 19,
wherein the one of the consumer components is configured to subscribe to the one of the hierarchically arranged topics, and
wherein the one or more processors are further configured to, in response to determining that the one of the consumer components operates entirely within the single one of the multiple logical systems, automatically extend the one of the hierarchically arranged topics to include the include a topic prefix identifying the single one of the multiple logical systems.

21. The network device of claim 12, wherein the one or more processors are configured to:
configure a first propagation topic to which the objects are capable of being published; and
configure a second propagation topic to which the objects are capable of being published to be hierarchically arranged above the first propagation topic.

22. The network device of claim 12,
wherein the producer components comprise one or more of a master routing engine and a local routing engine, and
wherein the consumer components comprise one or more of the local routing engine, an interface card, and a packet forwarding engine.

23. A non-transitory computer-readable storage medium having stored thereon instructions that, when executed, cause one or more processors of a single network device to:
configure a hierarchical naming scheme for distributing state information locally within the single network device, the hierarchical naming scheme associating objects representative of the state information to hierarchically arranged topics, and the state information representing a current state of resources within the single network device;
associate consumer components executing within the single network device to the hierarchically arranged topics;
operate a producer component executing within the single network device to publish an object to one of the hierarchically arranged topics; and
propagate the published object to one of the consumer components associated with the one of the hierarchically arranged topics, wherein the one of the consumer components is configured to consume the propagated object to update a configuration of the one of the consumer components.

24. A multi-chassis router comprising:
a distributed topic database configured to store a hierarchical naming scheme for distributing state information locally within the multi-chassis router, the hierarchical naming scheme associating objects representative of the state information to hierarchically arranged topics, the state information representing a current state of resources within the single network device, and the multi-chassis router is a single multi-chassis router; and
a first node that includes one or more processors configured to operate as consumer components within the single multi-chassis router; and
a second node that includes one or more processors configured to:
associate the consumer components executing within the single multi-chassis router to the hierarchically arranged topics;
operate as a producer component executing within the single multi-chassis router to publish an object to one of the hierarchically arranged topics; and
propagate the published object to one of the consumer components associated with the one of the hierarchically arranged topics, wherein the one of the consumer components is configured to consume the propagated object to update a configuration of the one of the consumer components.

\* \* \* \* \*